United States Patent
Ueda et al.

(10) Patent No.: US 8,283,089 B2
(45) Date of Patent: Oct. 9, 2012

(54) DIRECT OXIDATION FUEL CELL

(75) Inventors: Hideyuki Ueda, Osaka (JP); Hiroaki Matsuda, Osaka (JP)

(73) Assignee: Panasonic Corporation, Osaka (JP)

( * ) Notice: Subject to any disclaimer, the term of this patent is extended or adjusted under 35 U.S.C. 154(b) by 845 days.

(21) Appl. No.: 12/328,239

(22) Filed: Dec. 4, 2008

(65) Prior Publication Data

US 2009/0148752 A1  Jun. 11, 2009

(30) Foreign Application Priority Data

Dec. 4, 2007  (JP) ................. 2007-313704

(51) Int. Cl.
  *H01M 4/86*  (2006.01)
  *H01M 8/10*  (2006.01)
(52) U.S. Cl. ...................... 429/506; 429/523
(58) Field of Classification Search ............. 429/506, 429/523
  See application file for complete search history.

(56) References Cited

U.S. PATENT DOCUMENTS

| | | | |
|---|---|---|---|
| 6,933,067 B2 * | 8/2005 | Kawahara et al. | 429/523 X |
| 7,291,417 B2 * | 11/2007 | Herman et al. | 429/505 X |
| 2003/0175579 A1 | 9/2003 | Uchida et al. | |
| 2010/0062307 A1 * | 3/2010 | Ueda et al. | 429/30 |

FOREIGN PATENT DOCUMENTS

| | | |
|---|---|---|
| JP | 2005-183368 | 7/2005 |
| JP | 2005-353541 | 12/2005 |
| JP | 2006-107877 | 4/2006 |
| JP | 2006-244907 | * 9/2006 |

OTHER PUBLICATIONS

Computer-generated translation of JP-2006-244907, from the Japanese Patent Office website (doc date: Sep. 2006).*
United States Office Action issued in U.S. Appl. No. 12/556,167 dated Nov. 10, 2011.

* cited by examiner

*Primary Examiner* — Stephen J. Kalafut
(74) *Attorney, Agent, or Firm* — McDermott Will & Emery LLP (57) ABSTRACT

A direct oxidation fuel cell of the invention includes at least one unit cell, the unit cell including a membrane-electrode assembly including an electrolyte membrane and an anode and a cathode sandwiching the electrolyte membrane, an anode-side separator being in contact with the anode, and a cathode-side separator being in contact with the cathode. The anode includes an anode catalyst layer and an anode diffusion layer, the anode catalyst layer containing an anode catalyst. The cathode includes a cathode catalyst layer and a cathode diffusion layer, the cathode catalyst layer containing a cathode catalyst. The anode-side separator has a fuel flow channel for supplying fuel to the anode. A portion of the cathode catalyst layer facing the upstream of the fuel flow channel has an effective reaction area per unit area larger than that of a portion of the cathode catalyst layer facing the downstream of the fuel flow channel.

4 Claims, 6 Drawing Sheets

DIRECT OXIDATION FUEL CELL

FIELD OF THE INVENTION

The invention relates to direct oxidation fuel cells directly using fuel without reforming it into hydrogen. More particularly, the invention relates to improvements in electrodes for direct oxidation fuel cells.

BACKGROUND OF THE INVENTION

With the advancement of ubiquitous network society, the demand for portable equipment such as cellular phones, notebook personal computers, and digital still cameras has been remarkably increased. As the power source for such mobile equipment, fuel cells, which need no recharging and will operate as long as fuel is supplied, are expected to be put into practical use as early as possible.

Among such fuel cells, direct oxidation fuel cells, which generate electric power by directly supplying an organic fuel such as methanol or dimethyl ether to an anode for oxidation without reforming the fuel into hydrogen, have been attracting attention, for which active research and development have been performed. The reasons for this include that the theoretical energy densities of organic fuels are high, and that the storage of organic fuels is easy, and the use of organic fuels can simplify the fuel cell system.

Direct oxidation fuel cells include a unit cell comprising a membrane-electrode assembly (hereinafter referred to as an "MEA") sandwiched between separators. The MEA generally includes a solid polymer electrolyte membrane and an anode and a cathode sandwiching the electrolyte membrane, the anode and the cathode each including a catalyst layer and a diffusion layer. Such direct oxidation fuel cells generate power by supplying fuel and water to the anode and supplying oxidant such as oxygen to the cathode.

For example, the electrode reactions of a direct methanol fuel cell (hereinafter referred to as a "DMFC"), which uses methanol as the fuel, are as follows.

Anode: $CH_3OH + H_2O \rightarrow CO_2 + 6H^+ + 6e^-$
Cathode: $3/2 O_2 + 6H^+ + 6e^- \rightarrow 3H_2O$ Specifically, at the anode, methanol reacts with water to produce carbon dioxide, protons, and electrons. The protons produced at the anode migrate through the electrolyte membrane to reach the cathode, and the electrons migrate through an external circuit to reach the cathode. At the cathode, these protons and electrons combine with oxygen to form water.

However, there have been several problems in putting DMFCs into practical use.

One of them is a problem regarding the durability. In the interior of a cathode catalyst layer and/or the interface between the cathode catalyst layer and a cathode diffusion layer, with the passage of power generation time, water produced by reaction and/or water transferred from the anode will accumulate in the form of liquid. The accumulated water causes the diffusibility of oxidant to deteriorate and thus the cathodic concentration overvoltage to increase. This is considered to be a primary cause of the initial deterioration of the power generation performance of DMFCs.

This initial deterioration is strongly influenced by methanol crossover (hereinafter referred to as "MCO"). MCO is the phenomenon of permeation of unreacted methanol through the electrolyte membranes to reach the cathode.

In other words, in the cathode catalyst layer, oxidation reaction of crossover methanol occurs simultaneously with a reaction that normally occurs at the cathode, namely, reduction reaction of oxidant. For this reason, particularly when high-concentration methanol is used as the fuel, the amount of MCO increases with the passage of power generation time, causing the cathodic activation overvoltage to increase significantly. Moreover, carbon dioxide produced by the reaction causes the diffusibility of the oxidant to further deteriorate, and thus the power generation performance significantly deteriorates.

The initial deterioration as described above tends to occur in the cathode-side power generation region facing the upstream of the fuel flow channel where an amount of MCO is large. This initial deterioration becomes notable with the decrease of the three-phase interfaces where the catalyst phase, the electrolyte phase, and the oxygen phase coexist, the three-phase interfaces serving as electrode reaction sites.

In order to address these problems, there has been proposed a method of increasing the catalyst content in a DMFC relative to that in a solid polymer electrolyte fuel cell (PEFC), thereby to increase the surface area of the catalyst per unit projection area of the catalyst layer. However, an increase in the catalyst content throughout the entire catalyst layer leads to an increase in the overall thickness of the catalyst layer itself, so that it becomes difficult for the oxidant to reach the reaction sites in the interior of the catalyst layer. As a result, the power generation performance deteriorates.

Hence, as a solution to the above-discussed problems, many proposals have been made to improve the structure of the cathode catalyst layer itself.

For example, Japanese Laid-Open Patent Publication No. 2005-353541 (Document 1) and Japanese Laid-Open Patent Publication No. 2006-107877 (Document 2) disclose providing the cathode catalyst layer with a plurality of through holes or vertical holes. Documents 1 and 2, by way of providing a plurality of through holes or vertical holes, intend to allow the oxidant to be smoothly supplied into the deep portion of the catalyst layer as well as to allow water to be smoothly discharged from the deep portion of the catalyst layer even when the thickness of the cathode catalyst layer is increased.

Japanese Laid-Open Patent Publication No. 2005-183368 (Document 3) discloses setting the thicknesses of the anode catalyst layer and the cathode catalyst layer to 20 μm or more, and at the same time providing at least one of the catalyst layers with pores having a pore size of 0.3 to 2.0 μm such that the volume of these pores is equal to or greater than 4% of the total pore volume. Document 3, by way of providing the catalyst layer with pores as described above, intends to allow liquid fuel and oxidant to be smoothly supplied to the reaction sites in the interior of each electrode while the electron conductivity and the proton conductivity are allowed to remain substantially unchanged.

However, even with the use of the above-described techniques, in the cathode-side power generation region facing the upstream of the fuel flow channel where an amount of MCO is large, it is impossible to ensure sufficient three-phase interfaces serving as electrode reaction sites. Moreover, in the cathode-side power generation region facing the midstream and downstream of the fuel flow channel where the amount of MCO is reduced, it is impossible to maintain the smooth supply of oxidant to the interior of the catalyst layer and the smooth discharge of water from the deep portion of the catalyst layer. Therefore, it is difficult to obtain a catalyst layer with a small cathodic overvoltage with the use of the above-described techniques.

Specifically, in the case of the techniques represented by Documents 1 and 2, since a plurality of through holes or vertical holes are provided, in other words, since there are a large number of deficiencies in the cathode-side power generation region facing the upstream of the fuel flow channel where an amount of MCO is large, sufficient three-phase interfaces serving as electrode reaction sites fail to be provided and thus the cathodic overvoltage in this region increases. In the cathode-side power generation region facing the midstream and downstream of the fuel flow channel where the amount of MCO is reduced, the oxidant readily reaches the three-phase interfaces serving as electrode reaction sites through the plurality of through holes or vertical holes present in the interior of the catalyst layer. As such, in the initial stage of power generation when there is not much condensed water accumulated at the cathode, the power generation performance is comparatively good. However, with the passage of power generation time, condensed water is increasingly accumulated in the interior of the through holes or vertical holes, making it difficult to surely supply the oxidant into the deep portion of the cathode catalyst layer. Therefore, it is predicted that the power generation performance will deteriorate quickly.

In the case of the technique as disclosed in Document 3, the lower limit of the thickness of the catalyst layer, and the size and volume of pores are merely defined. Therefore, it is difficult to say that an optimum pore structure is realized throughout the entire catalyst layer, the optimum pore structure having all of the followings: the diffusibility of fuel or oxidant, the dischargeability of carbon dioxide or water being a reaction product, the electron conductivity, and the proton conductivity.

The invention intends to solve the foregoing conventional problems and to provide a direct oxidation fuel cell excellent in power generation performance and durability.

BRIEF SUMMARY OF THE INVENTION

A direct oxidation fuel cell of the invention includes at least one unit cell, the unit cell including a membrane-electrode assembly including an electrolyte membrane and an anode and a cathode sandwiching the electrolyte membrane, an anode-side separator being in contact with the anode, and a cathode-side separator being in contact with the cathode. The anode includes an anode catalyst layer and an anode diffusion layer, the anode catalyst layer containing an anode catalyst. The cathode includes a cathode catalyst layer and a cathode diffusion layer, the cathode catalyst layer containing a cathode catalyst. The anode-side separator has a fuel flow channel for supplying fuel to the anode, and the cathode-side separator has an oxidant flow channel for supplying oxidant to the cathode. A portion of the cathode catalyst layer facing the upstream of the fuel flow channel has an effective reaction area per unit area larger than that of a portion of the cathode catalyst layer facing the downstream of the fuel flow channel. Preferably, the effective reaction area per unit area is gradually reduced from the upstream toward the downstream of the fuel flow channel.

Preferably, the portion of the cathode catalyst layer facing the upstream of the fuel flow channel has a cathode catalyst content per unit area larger than that of the portion of the cathode catalyst layer facing the downstream of the fuel flow channel. Preferably, the cathode catalyst content per unit area is gradually reduced from the upstream toward the downstream of the fuel flow channel.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The direct oxidation fuel cell of the invention includes at least one unit cell, the unit cell including a membrane-electrode assembly including an electrolyte membrane and an anode and a cathode sandwiching the electrolyte membrane, an anode-side separator having a fuel flow channel for supplying fuel to the anode, and a cathode-side separator having an oxidant flow channel for supplying oxidant to the cathode. The effective reaction area per unit area of a portion of the cathode catalyst layer facing the upstream of the fuel flow channel (hereinafter referred to as the "upstream-side effective reaction area") is larger than the effective reaction area per unit area of a portion of the cathode catalyst layer facing the downstream of the fuel flow channel (hereinafter referred to as the "downstream-side effective reaction area").

Figure 1:
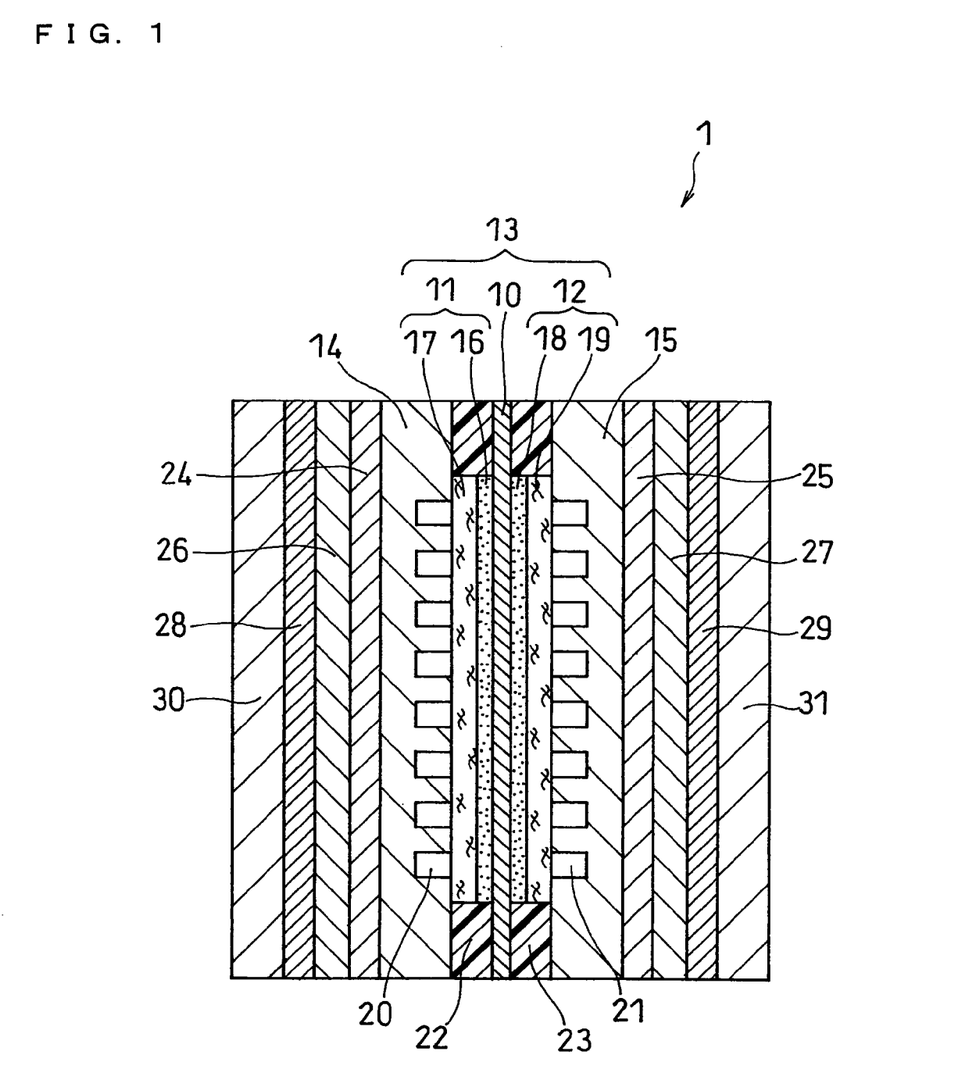
FIG. 1 is a longitudinal sectional view schematically illustrating the structure of a unit cell included in a direct oxidation fuel cell according to one embodiment of the invention.

FIG. 1 is a longitudinal sectional view of a unit cell included in a fuel cell according to one embodiment of the invention.

A unit cell 1 of FIG. 1 includes a membrane-electrode assembly (MEA) 13 comprising an electrolyte membrane 10 and an anode 11 and a cathode 12 sandwiching the electrolyte membrane 10, and an anode-side separator 14 and a cathode-side separator 15 sandwiching the MEA 13.

The anode 11 includes an anode catalyst layer 16 being in contact with the electrolyte membrane 10 and an anode diffusion layer 17 being in contact with the anode-side separator 14. The cathode 12 includes a cathode catalyst layer 18 being in contact with the electrolyte membrane 10 and a cathode diffusion layer 19 being in contact with the cathode-side separator 15.

The anode-side separator 14 has, on the surface facing the anode 11, a flow channel 20 for supplying fuel and discharging unused fuel and a reaction product. The cathode-side separator 15 has, on the surface facing the cathode 12, a flow channel 21 for supplying oxidant and discharging unused oxidant and a reaction product to outside.

Around the anode 11 and the cathode 12, gaskets 22 and 23 are disposed, respectively, so as to sandwich the electrolyte membrane 10, in order to prevent leakage of the fuel, oxidant, and reaction products.

Further, in the unit cell 1 of FIG. 1, the separators 14 and 15 are sandwiched between current collector plates 24 and 25, sheet heaters 26 and 27, insulator plates 28 and 29, and end plates 30 and 31, respectively. The unit cell 1 is secured by clamping means (not shown).

The cathode catalyst layer 18 is mainly composed of: conductive carbon particles carrying catalyst metal fine particles, or catalyst metal fine particles; and a polymer electrolyte. As the catalyst metal included in the cathode catalyst layer 18, for example, Pt fine particle may be used. As the polymer electrolyte included in the cathode catalyst layer 18, the same material constituting the electrolyte membrane 10 is preferably used.

Figure 2:
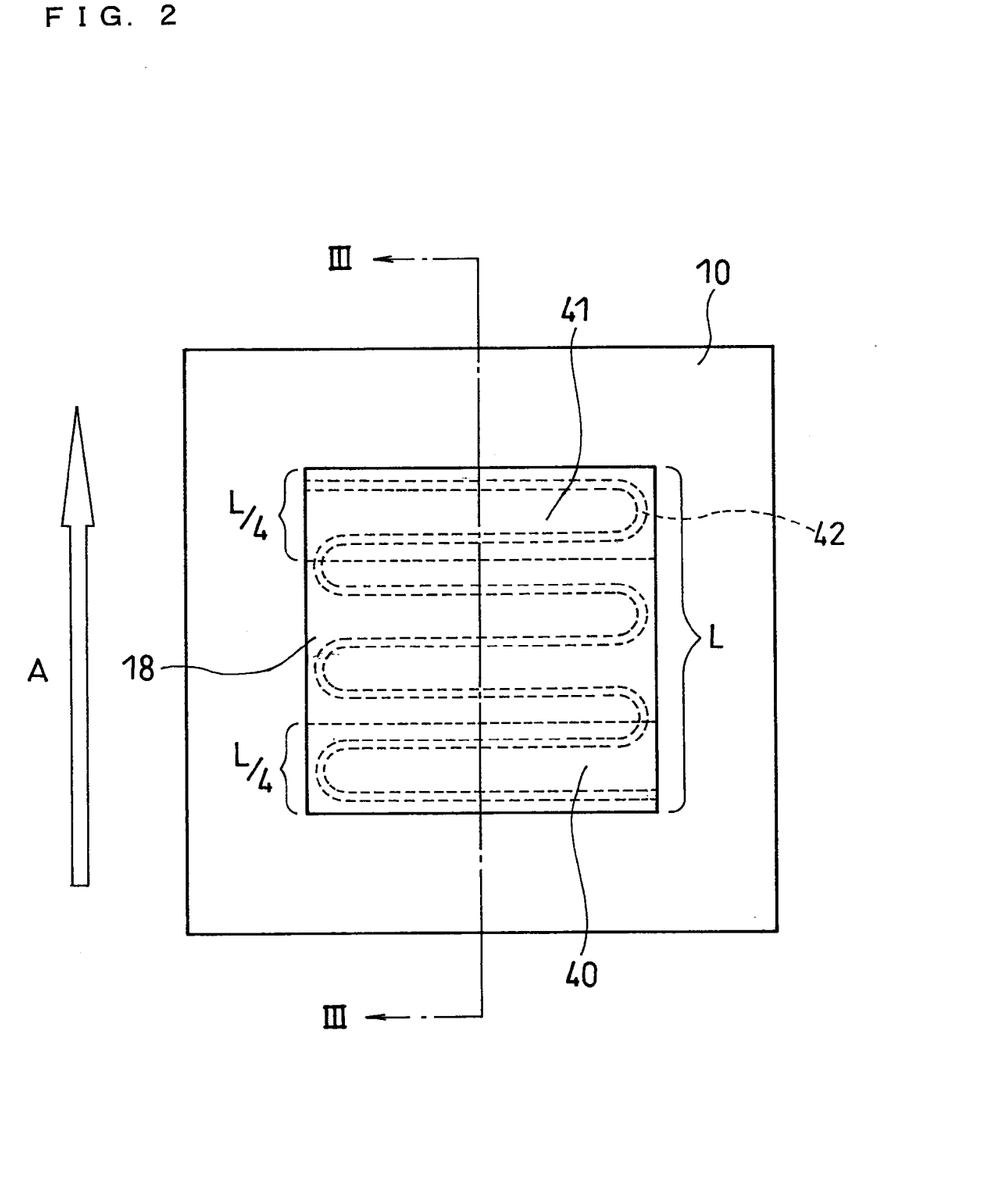
FIG. 2 is a front view schematically illustrating a cathode catalyst layer included in a direct oxidation fuel cell according to one embodiment of the invention.
Figure 3:
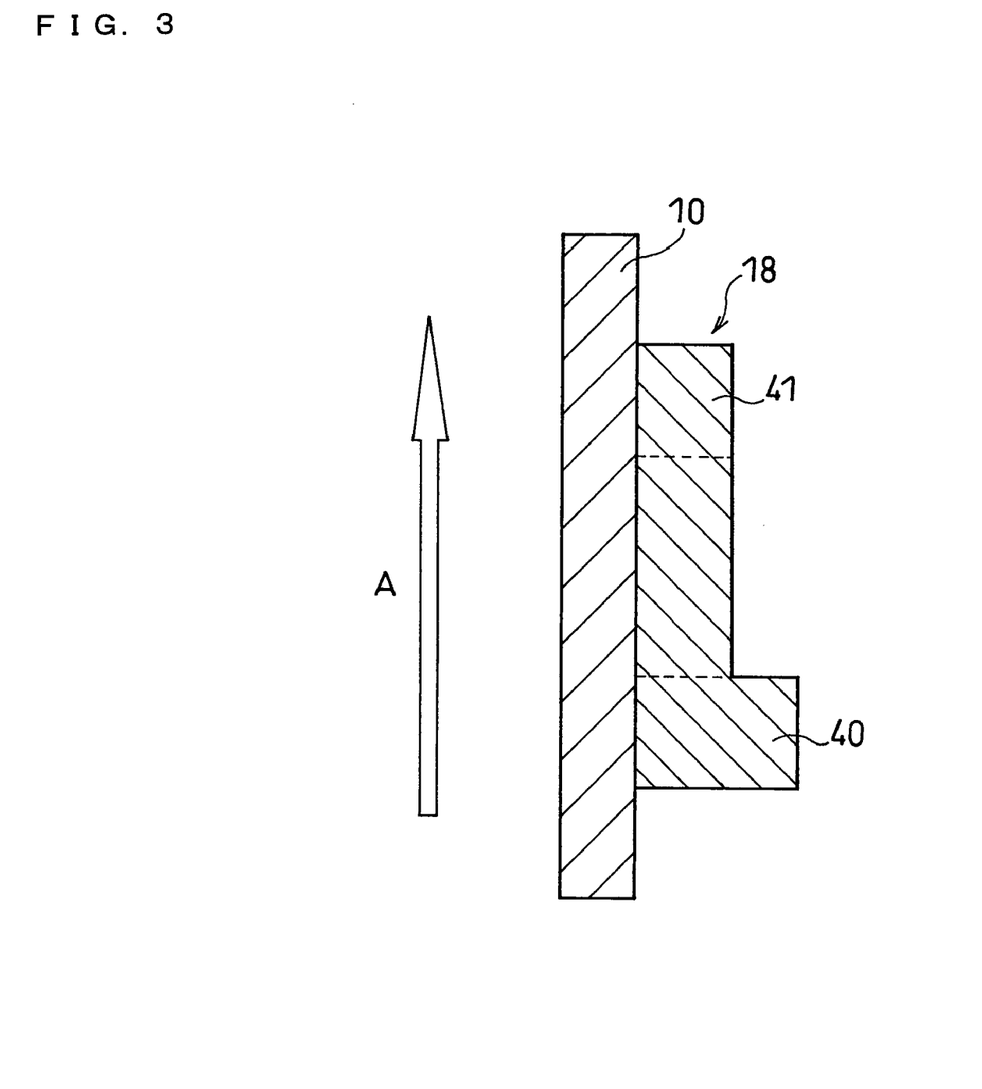
FIG. 3 is a sectional view taken along the line III-III of the cathode catalyst layer illustrated in FIG. 2.

Next, the structure of the cathode catalyst layer 18 is described with reference to the drawings. FIG. 2 is a front view schematically illustrating a cathode catalyst layer included in a fuel cell according to one embodiment of the invention, and FIG. 3 is a sectional view taken along the line III-III in FIG. 2. The cathode catalyst layer 18 and the electrolyte membrane 10 carrying the cathode catalyst layer 18 are illustrated in FIGS. 2 and 3. In FIG. 2, a serpentine-shaped fuel flow channel 42 which the cathode catalyst layer faces is also shown in dotted lines.

In the invention, the effective reaction area per unit area of a portion 40 of the cathode catalyst layer 18 facing the upstream of the fuel flow channel (a region being located in the upstream side of the fuel flow channel and having an area equal to one fourth of the entire area of the power generation region), namely, the upstream-side effective reaction area, is larger than the effective reaction area per unit area of a portion 41 facing the downstream of the fuel flow channel (a region being located in the downstream side of the fuel flow channel and having an area equal to one fourth of the entire area of the power generation region), namely, the downstream-side effective reaction area. The arrow A (the direction A) in FIG. 2 indicates an average direction in which the fuel flows from the upstream to the downstream in the fuel flow channel.

Here, as illustrated in FIG. 2, when the length of a side parallel to the direction A of the cathode catalyst layer 18 is denoted by L, the portion (upstream portion) 40 of the cathode catalyst layer 18 facing the upstream of the fuel flow channel is a region of the cathode catalyst layer located so as to face the upstream of the fuel flow channel and have a length along the direction A of L/4 (i.e., a region having an area equal to one fourth of the area of the cathode catalyst layer). The portion (downstream portion) 41 of the cathode catalyst layer 18 facing the downstream of the fuel flow channel is a region of the cathode catalyst layer located so as to face the downstream of the fuel flow channel and have a length along the direction A of L/4 (i.e., a region having an area equal to one fourth of the area of the cathode catalyst layer).

The effective reaction area per unit area of a specific portion of the cathode catalyst layer is calculated by the following equation:

(Effective reaction area of a specific portion of the cathode catalyst layer)/(Area of the specific portion of the cathode catalyst layer).

The effective reaction area of a specific portion of the cathode catalyst layer is measured as follows. In a unit cell prepared for the measurement, while humidified nitrogen gas is allowed to flow in the cathode and humidified hydrogen gas is allowed to flow in the anode, the potential difference between the cathode and the anode is changed in the range of 0.07 V to 0.6 V at a rate of 10 mV·s$^{-1}$ by the cyclic voltammetry (CV), during which the current value is measured to obtain a current-potential curve. From the current-potential curve thus obtained, an amount of electricity generated through hydrogen gas adsorption/desorption is obtained. The value thus obtained is divided by an amount of electricity generated through hydrogen adsorption/desorption per 1 cm$^2$ of catalyst, thereby to give an effective reaction area of a specific portion of the cathode catalyst layer. Here, the amount of electricity generated through hydrogen adsorption/desorption is an intrinsic value to catalyst. For example, the amount of electricity generated through hydrogen adsorption/desorption per 1 cm$^2$ of platinum (Pt) is 210 μC/cm$^2$.

The amount of electricity generated through hydrogen adsorption/desorption per 1 cm$^2$ of catalyst is determined, on the assumption that when one hydrogen atom is adsorbed on one catalyst atom, one electron is discharged, from the atom density (atoms/cm$^2$) on the surface of catalyst and the electrical charge of one mole of electrons (=96485 C).

The area of a specific portion of the cathode catalyst layer is an area (projection area) calculated using the shape of the contour of the specific portion seen along the direction normal to the main surface of the cathode catalyst layer. For example, in the case where the contour of a specific portion of the cathode catalyst layer seen along the normal direction has a rectangular shape, the area of the specific portion of the cathode catalyst layer is calculated as (Longitudinal length)× (Lateral length).

In the invention, instead of homogeneously increasing the catalyst reaction sites where at least two phases, the catalyst phase and the electrolyte phase, coexist throughout the entire region of the cathode catalyst layer, the effective reaction area per unit area is increased in the portion of the cathode-side power generation region facing the upstream of the fuel flow channel where an amount of MCO is large (i.e., the portion of the cathode catalyst layer facing the upstream of the fuel flow channel) as compared with in the portion of the cathode catalyst layer facing the downstream of the fuel flow channel. By doing this, in the cathode catalyst layer, it is possible to ensure the number of catalyst reaction sites required for allowing the oxidant reduction reaction and the crossover methanol oxidation reaction to proceed simultaneously. Moreover, in the cathode-side power generation region facing the downstream of the fuel flow channel where the amount of MCO is reduced, it is possible to form a catalyst layer structure with an optimized number of catalyst reaction sites such that the supply of oxidant and the discharge of water from the deep portion of the catalyst layer are not inhibited. This results in reduced cathodic overvoltage and improved durability of the fuel cell.

Specifically, according to the invention, in the portion of the cathode-side power generation region facing the upstream of the fuel flow channel where an amount of MCO is large, sufficient three-phase interfaces serving as electrode reaction sites can be ensured. In addition, in the cathode-side power generation region facing the downstream of the fuel flow channel where the amount of MCO is reduced, a smooth supply of oxidant to the interior of the catalyst layer and a smooth discharge of water from the deep portion of the catalyst layer can be maintained. As a result, the cathodic overvoltage can be reduced. The invention, therefore, can provide a direct oxidation fuel cell excellent in power generation performance and durability.

In the invention, by making the cathode catalyst content per unit area in the upstream portion 40 larger than that in the downstream portion 41, the upstream-side effective reaction area can be made larger than the downstream-side effective reaction area. The cathode catalyst content can be made larger in the upstream portion 40 by making the thickness of the cathode catalyst layer 18 in the upstream portion 40 larger than that in the downstream portion 41 as shown in FIG. 3.

Here, the cathode catalyst content per unit area in a specific portion (e.g., the upstream portion) of the cathode catalyst layer is a cathode catalyst content in a specific portion of the cathode catalyst layer, measured per unit projection area of the specific portion.

As described above, by increasing the cathode catalyst content in the portion of the cathode catalyst layer facing the upstream of the fuel flow channel where an amount of MCO is large rather than in the entire region of the cathode catalyst layer, it is possible to avoid using an excessive amount of catalyst as well as to effectively ensure the catalyst reaction sites.

The structure of the cathode catalyst layer is not limited to that as illustrated in FIGS. 2 and 3 as long as the upstream-side effective reaction area is larger than the downstream-side effective reaction area.

Figure 4:
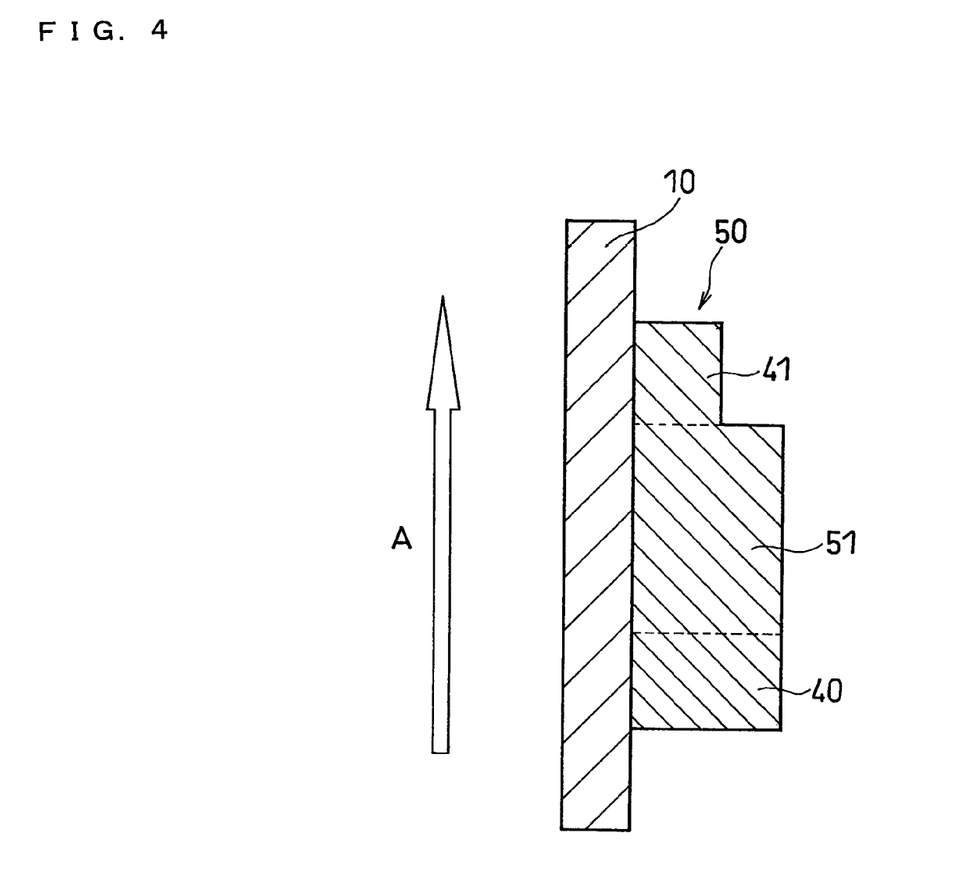
FIG. 4 is a longitudinal sectional view schematically illustrating the structure of a cathode catalyst layer included in a direct oxidation fuel cell according to another embodiment of the invention.

For example, the structure of the cathode catalyst layer may be the one as illustrated in FIG. 4. FIG. 4 is a longitudinal sectional view schematically illustrating a cathode catalyst layer included in a fuel cell according to another embodiment of the invention. In FIG. 4, the same components as in FIGS. 2 and 3 are denoted by the same reference numerals.

In a cathode catalyst layer 50 of FIG. 4, the thicknesses of the upstream portion 40 and a portion (midstream portion) 51 facing the midstream of the fuel flow channel are made larger than the thickness of the downstream portion 41. In other words, the catalyst content in the upstream portion 40 and the midstream portion 51 is made larger than the catalyst content in the downstream portion 41. By doing this, the upstream-side effective reaction area and the effective reaction area per unit area of a portion of the cathode catalyst layer facing the midstream of the fuel flow channel (hereinafter referred to as the "midstream-side effective reaction area") can be made larger than the downstream-side effective reaction area.

In yet another embodiment of the invention, the effective reaction area in the cathode catalyst layer may be gradually reduced from the upstream toward the downstream of the fuel flow channel.

Figure 5:
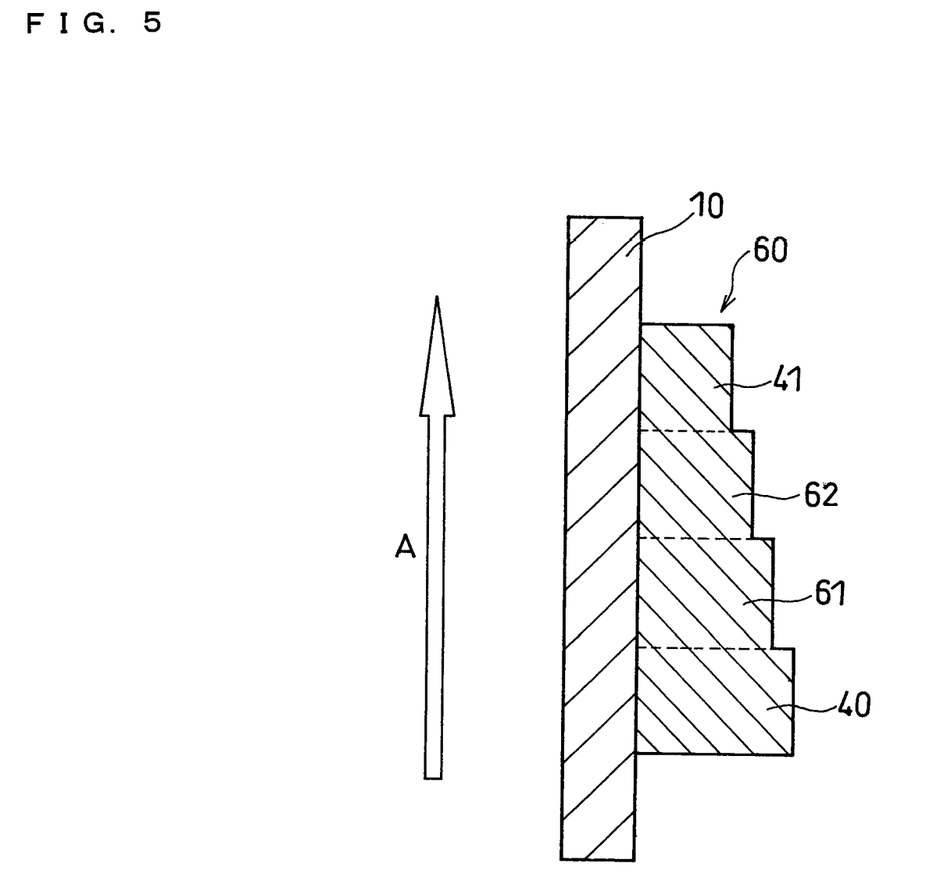
FIG. 5 is a longitudinal sectional view schematically illustrating the structure of a cathode catalyst layer included in a direct oxidation fuel cell according to yet another embodiment of the invention.

FIG. 5 is a longitudinal sectional view schematically illustrating a cathode catalyst layer included in a fuel cell according to yet another embodiment of the invention. Also in FIG. 5, the same components as in FIGS. 2 and 3 are denoted by the same reference numerals.

In FIG. 5, the thickness of a cathode catalyst layer is gradually reduced from the upstream toward the downstream of the fuel flow channel. To be concrete, the midstream portion of the cathode catalyst layer 60 is divided into two portions referred to as a first midstream portion 61 and a second midstream portion 62, and the thickness of cathode catalyst layer is gradually reduced along the direction A in the order of the upstream portion 40, the first midstream portion 61, the second midstream portion 62, and the downstream portion 41. In other words, the catalyst content in the cathode catalyst layer is gradually reduced from the upstream toward the downstream of the fuel flow channel. By gradually reducing the thickness of the cathode catalyst layer (i.e., the cathode catalyst content) from the upstream toward the downstream of the fuel flow channel as described above, the effective reaction area per unit area in the cathode catalyst layer can be gradually reduced from the upstream toward the downstream of the fuel flow channel. Here, the lengths parallel to the direction of A of the first midstream portion 61 and the second midstream portion 62 may be equal to or different from each other.

Alternatively, the effective reaction area in the cathode catalyst layer may be continuously reduced from the upstream toward the downstream of the fuel flow channel by continuously reducing the thickness of the cathode catalyst layer from the upstream toward the downstream of the fuel flow channel.

Among the above-described structures, the structure in which the effective reaction area in the cathode catalyst layer is gradually or continuously reduced from the upstream toward the downstream of the fuel flow channel is preferred. With such a structure, the catalyst content in the cathode catalyst layer (i.e., the number of catalyst reaction sites present in the cathode catalyst layer) is optimized corresponding to the amount of MCO, and in particular, in the cathode-side power generation region facing the midstream of the fuel flow channel, the supply of oxidant and/or the discharge of water from the deep portion of the catalyst layer can be improved. As such, the cathodic overvoltage can be maintained at a low potential.

The ratio of the upstream effective reaction area to the downstream effective reaction area is preferably 1.3 to 3.0. When the ratio within this range, it is possible to ensure the number of catalyst reaction sites required for allowing the oxidant reduction reaction and the crossover methanol oxidation reaction to proceed simultaneously as well as to maintain the smooth supply of oxidant and the smooth discharge of water. If the ratio is less than 1.3, it is difficult to ensure the number of catalyst reaction sites required for allowing the oxidant reduction reaction and the crossover methanol oxidation reaction to proceed simultaneously. If the ratio is greater than 3.0, it is difficult to maintain the smooth supply of oxidant to the interior of the catalyst layer and the smooth discharge of water from the deep portion of the catalyst layer.

The ratio of the catalyst content per unit area in the upstream portion of the cathode catalyst layer to that in the downstream portion of the cathode catalyst layer is preferably 1.3 to 3.0.

In the case where the catalyst content per unit area in the cathode catalyst layer is gradually or continuously reduced from the upstream toward the downstream of the fuel flow channel, the catalyst content (per unit area) is preferably reduced at a rate of 0.1 to 0.3 mg/cm from the upstream toward the downstream of the fuel flow channel.

Figure 6:
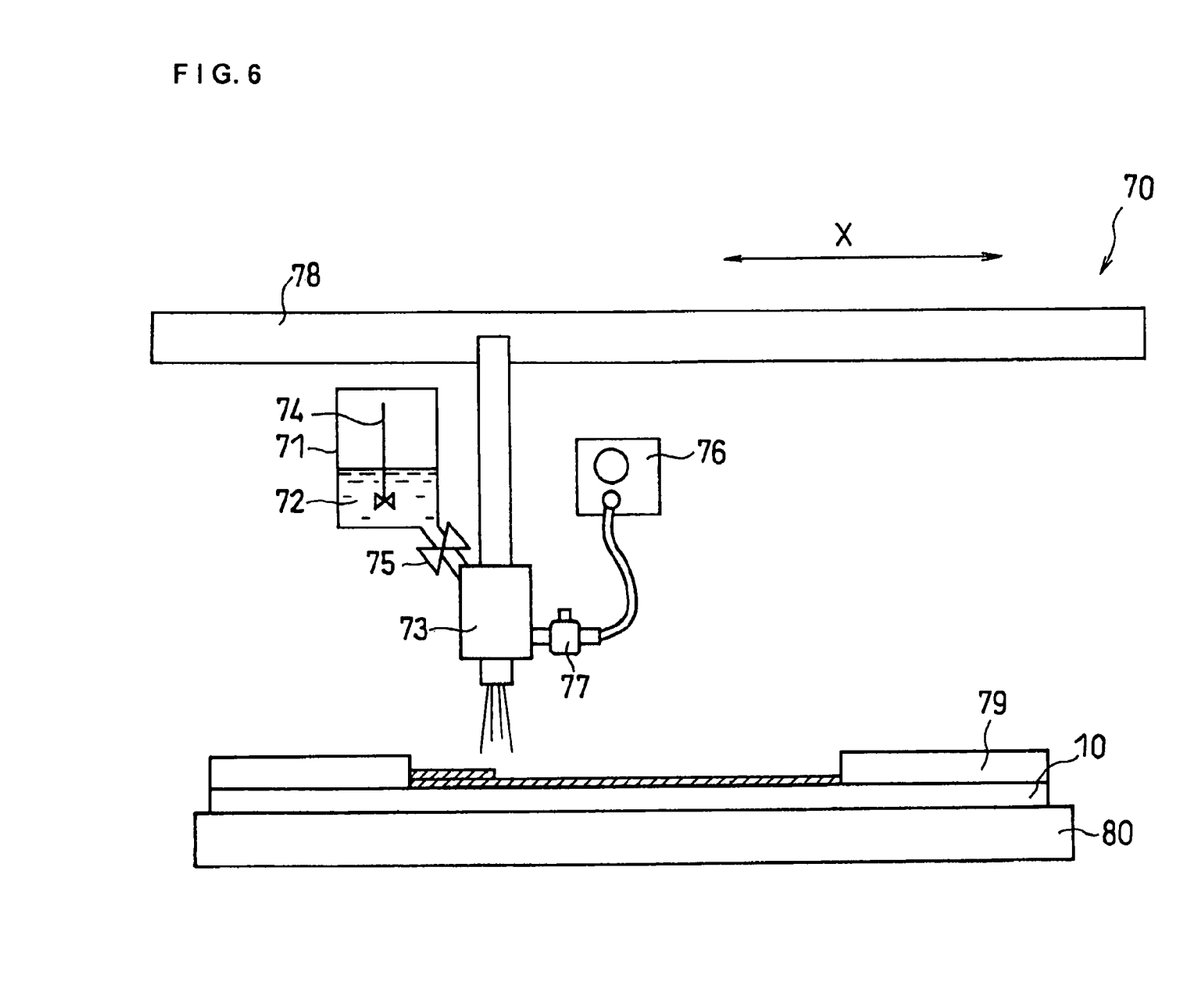
FIG. 6 is a schematic view illustrating an example of the configuration of a spray coater used to form a cathode catalyst layer.

The cathode catalyst layers as illustrated in FIGS. 2 to 5 can be produced by, for example, using a spray coater 70 as illustrated in FIG. 6. FIG. 6 is a schematic view illustrating an example of the configuration of a spray coater used to form a cathode catalyst layer.

The spray coater 70 includes a tank 71 with a cathode catalyst ink 72 contained therein, and a spray gun 73.

In the tank 71, the cathode catalyst ink 72 is constantly stirred by a stirrer 74. The cathode catalyst ink 72 is fed to the spray gun 73 through an open/close valve 75 and ejected from the spray gun 73 together with jet gas. The jet gas is fed through a gas pressure adjustor 76 and a gas flow rate adjustor 77 to the spray gun 73. As the jet gas, for example, nitrogen gas may be used.

In the coater 70 of FIG. 6, the spray gun 73 is movable by means of an actuator 78 on the plane perpendicular to the sheet of drawing, in two directions, namely, a direction along an X axis parallel to the arrow X and a direction along a Y axis perpendicular to the X axis, from a desired start position and at a desired speed.

Below the spray gun 73, the electrolyte membrane 10 is placed. By moving the spray gun 73 while allowing the cathode catalyst ink 72 to be ejected from the spray gun 73, a cathode catalyst layer can be formed on the electrolyte membrane 10. The coating region of the cathode catalyst ink 72 on the electrolyte membrane 10 can be adjusted by using a mask 79.

In forming a cathode catalyst layer, it is preferable to control the surface temperature of the electrolyte membrane 10. In the coater 70, the surface temperature of the electrolyte membrane 10 is controlled by a heater 80 arranged in contact with the electrolyte membrane 10.

As described above, in the coater 70, the cathode catalyst ink 72 can be ejected while the spray gun 73 is moved to a desired position. In other words, at a desired position of the cathode catalyst layer, the thickness thereof and/or the catalyst content therein can be changed. As such, the cathode catalyst layers as illustrated in FIGS. 3 to 5 can be formed easily and freely by using the coater 70.

In FIG. 6, the coater 70 in the process of forming a portion of the cathode catalyst layer that will face the upstream of a fuel flow channel by allowing the cathode catalyst ink 72 to be ejected from the spray gun 73 is illustrated.

In the following, components other than the cathode catalyst layer are described.

As the cathode diffusion layer 19, a conductive porous substrate with oxidant diffusibility, ability to discharge water produced through power generation, and electron conductivity may be used. Examples of such a conductive porous substrate include carbon paper, carbon cloth, and the like. This conductive porous substrate may be used after being subjected to water-repellent treatment according to a known technique. Alternatively, the surface of the conductive porous substrate in the cathode catalyst layer 18 side may be provided with a water-repellent carbon layer (not shown).

The anode catalyst layer 16 is mainly composed of: conductive carbon particles carrying catalyst metal fine particles, or catalyst metal fine particles; and a polymer electrolyte. As the catalyst metal contained in the anode catalyst layer 16, for example, a platinum-ruthenium (Pt—Ru) alloy fine particles may be used. The polymer electrolyte contained in the anode catalyst layer 16 is preferably the same as the material constituting the electrolyte membrane 10.

As the anode diffusion layer 17, a conductive porous substrate with fuel diffusibility, ability to discharge carbon dioxide produced through power generation, and electron conductivity may be used. Examples of such a conductive porous substrate include carbon paper, carbon cloth, and the like. This conductive porous substrate may be used after being subjected to water-repellent treatment according to a known technique. Alternatively, the surface of the conductive porous substrate in the anode catalyst layer 16 side may be provided with a water-repellent carbon layer (not shown).

The electrolyte membrane 10 is preferably excellent in such properties as proton conductivity, heat resistance, and chemical stability. There is no particularly limitation on the material constituting the electrolyte membrane 10 (polymer electrolyte), as long as the electrolyte membrane 10 has the above-described properties.

There is no particularly limitation on the material of the separators 14 and 15, as long as the separators 14 and 15 have hermeticity, electron conductivity, and electrochemical stability. There is no particularly limitation also on the shapes of the flow channels 20 and 21.

As the constituent materials of the current collectors 24 and 25, the sheet heaters 26 and 27, the insulator plates 28 and 29, and the end plates 30 and 31, know materials in the art may be used.

EXAMPLES

The invention is hereinafter described in detail by way of Examples, but these Examples are not to be construed as being limiting in any way the invention.

Example 1

The fuel cell as illustrated in FIG. 1 was produced.

The cathode catalyst layer 18 was prepared in the following manner.

As the cathode catalyst, conductive carbon particles with a mean primary particle size of 30 nm carrying Pt having a mean particle size of 3 nm was used. As the conductive carbon particles, carbon black (Ketjen black EC available from Mitsubishi Chemical Corporation) was used. The Pt content was set to 50% by weight of the total of the conductive carbon particles and the Pt.

The cathode catalyst was ultrasonically dispersed in an aqueous solution of isopropanol, and the resultant dispersion was mixed with an aqueous solution containing 5% by weight of polymer electrolyte. The resultant mixture was stirred by a disper to prepare a cathode catalyst ink. The weight ratio of the Pt catalyst particles to the polymer electrolyte in the cathode catalyst ink was set to 3:2. As the polymer electrolyte, perfluorocarbonsulfonic acid ionomer (Flemion available from Asahi Glass Co., Ltd.) was used.

Next, with the use of the spray coater illustrated in FIG. 6, the cathode catalyst layers as illustrated in FIGS. 2 and 3 were formed in a size of 6 cm×6 cm on the electrolyte membrane 10. As the electrolyte membrane 10, a perfluoroalkylsulfonic acid ion-exchange membrane (Nafion 112 available from E. I. du Pont de Nemours and Company) with a size of 12 cm×12 cm was used.

First, the cathode catalyst ink was applied twenty times onto a portion of the electrolyte membrane 10 corresponding to the power generation region (6 cm×6 cm) in its thickness direction. Thereafter, the cathode catalyst ink was further applied sixteen times onto a portion of the electrolyte membrane 10 facing the upstream of the fuel flow channel (6 cm×1.5 cm) only. The cathode catalyst layer 18 was thus formed.

The spray coating conditions were that: the center-to-center distance between portions adjacent to each other to be coated with the cathode catalyst ink ejected from the spray gun in their width direction was 10 mm; and the start position of spray coating was shifted in the direction along the X axis by 1 mm (an offset of 1 mm) every coating. The spray gun 44 was moved at a rate of 40 mm/sec. As the jet gas, nitrogen gas was used. The jet pressure of the jet gas was set to 0.20 MPa. The surface temperature of the electrolyte membrane 10 at the time of spray coating was adjusted to 60° C.

The Pt catalyst content in the upstream portion of the cathode catalyst layer was 1.66 mg/cm$^2$, and the Pt catalyst content in the midstream portion and the downstream portion of the cathode catalyst layer was 0.91 mg/cm$^2$. It should be noted that the catalyst content is a value per unit projection area of the catalyst layer (i.e., a value per unit area of the catalyst layer seen along the direction normal to the main surface thereof). This applies to the following description.

The anode catalyst layer 16 was prepared in the following manner.

As the anode catalyst, Pt—Ru alloy fine particles having a mean particle size of 3 nm was used (the weight ratio of Pt:Ru was 2:1). The anode catalyst was ultrasonically dispersed in an aqueous solution of isopropanol, and the resultant dispersion was mixed with an aqueous solution containing 5% by weight of polymer electrolyte. The resultant mixture was highly dispersed in a bead mill to prepare an anode catalyst ink. The weight ratio of the Pt—Ru alloy fine particles to the polymer electrolyte in the anode catalyst ink was set to 2:1. As the polymer electrolyte, perfluorocarbonsulfonic acid ionomer (Flemion available from Asahi Glass Co., Ltd.) was used.

Next, the anode catalyst ink was applied by a doctor blade method onto the other surface of the electrolyte membrane 10 opposite to the surface on which the cathode catalyst layer 18 was formed, so that the anode catalyst layer 16 was formed so as to be opposite to the cathode catalyst layer 18. The anode catalyst layer 16 was formed in a size of cm×6 cm. The Pt—Ru catalyst content in the anode catalyst layer 16 was set to 6.5 mg/cm$^2$.

A membrane-catalyst layer assembly (i.e., catalyst coated membrane (CCM)) was thus obtained.

Next, on the cathode catalyst layer 18 of the CCM, the cathode diffusion layer 19 was laminated; and on the anode catalyst layer 16 of the CCM, the anode diffusion layer 17 was laminated. The cathode diffusion layer 19 and the anode diffusion layer 17 had a size of 6 cm×6 cm. As the anode diffusion layer 17, a carbon paper (TGP-H090 available from Toray Industries Inc.) was used. On one surface of the carbon paper, a water-repellent carbon layer (PTFE content: 40%) had been provided beforehand in a thickness of approximately 30 μm. As the cathode diffusion layer 19, a carbon cloth (LT2500W available from E-TEK) with a water-repellent carbon layer provided on one surface thereof was used. The anode diffusion layer 17 and the cathode diffusion layer 19 were each disposed such that the carbon layer was in contact with the catalyst layer.

The resultant laminated body was subjected to hot pressing (at 130° C. and 4 MPa for 3 minutes), thereby to bond the catalyst layers and the diffusion layers together. The anode 11 and the cathode 12 were thus obtained.

Next, the gaskets 22 and 23 were thermally bonded (at 130° C. and 4 MPa for 5 minutes) to the electrolyte membrane 10 around the anode 11 and the cathode 12, respectively, so as to sandwich the electrolyte membrane 10, thereby to produce the membrane-electrode assembly (MEA) 13. As the gasket, a gasket with a three-layer structure composed of a polyetherimide layer serving as a center layer and silicone rubber layers sandwiching the center layer was used.

The MEA 13 thus obtained was sandwiched between the separators 14 and 15, the current collector plates 24 and 25, the sheet heaters 26 and 27, the insulator plates 28 and 29, and the end plates 30 and 31, all of which had outer dimensions of 12 cm×12 cm, and then secured with clamping rods. The clamping pressure was set to 12 kgf/cm$^2$ per area of the separator.

As the separators 14 and 15, a resin-impregnated graphite material of 4 mm in thickness (G347B available from TOKAI CARBON CO., LTD.) was used. The separators 14 and 15 had been provided with the serpentine-shaped flow channels 20 and 21, respectively, the flow channels having a width of 1.5 mm and a depth of 1 mm. As the current collector plates 24 and 25, a gold-plated stainless steel plate was used. As the sheet heaters 26 and 27, SAMICONE heater (available from SAKAGUCHI E.H. VOC CORP.) was used.

The direct oxidation fuel cell produced in the manner as described above was referred to as a fuel cell A.

Example 2

With the use of the spray coater of FIG. 6, the cathode catalyst ink was applied twenty times onto a portion of the electrolyte membrane corresponding to the entire power generation region (6 cm×6 cm) in its thickness direction. Thereafter, the cathode catalyst ink was further applied sixteen times onto a portion of the electrolyte membrane facing the upstream and midstream of the fuel flow channel. The cathode catalyst layer was thus formed.

Except for the above, a fuel cell B was produced in the same manner as in Example 1.

The Pt catalyst content in the upstream portion and the midstream portion of the cathode catalyst layer was 1.66 mg/cm$^2$, and the Pt catalyst content in the downstream portion of the cathode catalyst layer was 0.91 mg/cm$^2$.

Example 3

With the use of the spray coater of FIG. 6, the cathode catalyst ink was applied twenty times onto a portion of the electrolyte membrane corresponding to the entire power generation region (6 cm×6 cm) in its thickness direction. Thereafter, the cathode catalyst ink was further applied eight times onto a portion of the electrolyte membrane facing the upstream and midstream of the fuel flow channel (6 cm×4.5 cm). In addition, the cathode catalyst ink was further applied eight times onto a portion of the electrolyte membrane facing the upstream of the fuel flow channel (6 cm×1.5 cm). The cathode catalyst layer was thus formed.

Except for the above, a fuel cell C was produced in the same manner as in Example 1.

The Pt catalyst content in the upstream portion of the cathode catalyst layer was 1.66 mg/cm$^2$, the Pt catalyst content in the midstream portion of the cathode catalyst layer was 1.29 mg/cm$^2$, and the Pt catalyst content in the downstream portion of the cathode catalyst layer was 0.91 mg/cm$^2$.

Example 4

With the use of the spray coater of FIG. 6, the cathode catalyst ink was applied twenty times onto a portion of the electrolyte membrane corresponding to the entire power generation region (6 cm×6 cm) in its thickness direction. Thereafter, the cathode catalyst ink was further applied eight times onto a portion of the electrolyte membrane facing the upstream and midstream of the fuel flow channel (6 cm×4.5 cm) in its thickness direction. In addition, the cathode catalyst ink was further applied four times onto a portion of the electrolyte membrane facing the upstream of the fuel flow channel and a portion facing the upstream-side half of the midstream portion (i.e., the first midstream portion) (total: cm×3 cm) in its thickness direction. The cathode catalyst ink was further applied four times onto a portion of the electrolyte membrane facing the upstream of the fuel flow channel only (6 cm×1.5 cm) in its thickness direction. The cathode catalyst layer was thus formed.

Except for the above, a fuel cell D was produced in the same manner as in Example 1.

The Pt catalyst content in the upstream portion of the cathode catalyst layer was 1.66 mg/cm$^2$, the Pt catalyst content in the first midstream portion of the cathode catalyst layer was 1.48 mg/cm$^2$, the Pt catalyst content in the second midstream portion of the cathode catalyst layer was 1.29 mg/cm$^2$, and the Pt catalyst content in the downstream portion of the cathode catalyst layer was 0.91 mg/cm$^2$.

Comparative Example 1

A comparative fuel cell 1 was produced in the same manner as in Example 1 except that the cathode catalyst layer was formed by applying the cathode catalyst ink thirty-six times onto a portion of the electrolyte membrane corresponding to the entire power generation region (6 cm×6 cm) in its thickness direction using the spray coater of FIG. 6. The Pt catalyst content in the cathode catalyst layer was 1.66 mg/cm$^2$.

Comparative Example 2

With the use of the spray coater of FIG. 6, the cathode catalyst ink was applied twenty times onto a portion of the electrolyte membrane corresponding to the entire power generation region (6 cm×6 cm) in its thickness direction. Thereafter, the cathode catalyst ink was further applied sixteen times onto a portion of the electrolyte membrane facing the downstream of the fuel flow channel (6 cm×1.5 cm) in its thickness direction. The cathode catalyst layer was thus formed.

Except for the above, a comparative fuel cell 2 was produced in the same manner as in Example 1.

The Pt catalyst content in the upstream portion and the midstream portion of the cathode catalyst layer was 0.91 mg/cm$^2$, the Pt catalyst content in the downstream portion of the cathode catalyst layer was 1.66 mg/cm$^2$.

Comparative Example 3

With the use of the spray coater of FIG. 6, the cathode catalyst ink was applied twenty times onto a portion of the electrolyte membrane corresponding to the entire power generation region (6 cm×6 cm) in its thickness direction. Thereafter, the cathode catalyst ink was further applied sixteen times onto a portion of the electrolyte membrane facing the midstream and downstream of the fuel flow channel cm×4.5 cm) in its thickness direction. The cathode catalyst layer was thus formed.

Except for the above, a comparative fuel cell 3 was produced in the same manner as in Example 1.

The Pt catalyst content in the upstream portion of the cathode catalyst layer was 0.91 mg/cm$^2$, the Pt catalyst content in the midstream portion and downstream portion of the cathode catalyst layer was 1.66 mg/cm$^2$.

Comparative Example 4

With the use of the spray coater of FIG. 6, the cathode catalyst ink was applied twenty times onto a portion of the electrolyte membrane corresponding to the entire power generation region (6 cm×6 cm) in its thickness direction. Thereafter, the cathode catalyst ink was further applied eight times onto a portion of the electrolyte membrane facing the midstream and downstream of the fuel flow channel (6 cm×4.5 cm) in its thickness direction. In addition, the cathode catalyst ink was further applied eight times onto a portion of the electrolyte membrane facing the downstream of the fuel flow channel (6 cm×1.5 cm) in its thickness direction. The cathode catalyst layer was thus formed.

Except for the above, a comparative fuel cell 4 was produced in the same manner as in Example 1.

The Pt catalyst content in the upstream portion of the cathode catalyst layer was 0.91 mg/cm$^2$, the Pt catalyst content in the midstream portion of the cathode catalyst layer was 1.29 mg/cm$^2$, and the Pt catalyst content in the downstream portion of the cathode catalyst layer was 1.66 mg/cm$^2$.

Comparative Example 5

With the use of the spray coater of FIG. 6, the cathode catalyst ink was applied twenty times onto a portion of the electrolyte membrane corresponding to the entire power generation region (6 cm×6 cm) in its thickness direction. Thereafter, the cathode catalyst ink was further applied eight times onto a portion of the electrolyte membrane facing the midstream and downstream of the fuel flow channel (6 cm×4.5 cm) in its thickness direction. Subsequently, the cathode catalyst ink was further applied four times onto a portion of the electrolyte membrane facing the downstream-side half of the midstream of the fuel flow channel (i.e., the second midstream portion) and a portion facing the downstream of the fuel flow channel (total: 6 cm×3 cm) in its thickness direction. In addition, the cathode catalyst ink was further applied four times onto a portion of the electrolyte membrane facing the downstream of the fuel flow channel (6 cm×1.5 cm) in its thickness direction. The cathode catalyst layer was thus formed.

Except for the above, a comparative fuel cell 5 was produced in the same manner as in Example 1.

The Pt catalyst content in the upstream portion of the cathode catalyst layer was 0.91 mg/cm$^2$, the Pt catalyst content in the first midstream portion of the cathode catalyst layer was 1.29 mg/cm$^2$, the Pt catalyst content in the second midstream portion of the cathode catalyst layer was 1.48 mg/cm$^2$, and the Pt catalyst content in the downstream portion of the cathode catalyst layer was 1.66 mg/cm$^2$.

[Evaluation]

(Effective Reaction Area Per Unit Area of Specific Portion of Cathode Catalyst Layer)

The effective reaction area per unit area of a specific portion of the cathode catalyst layers used in the fuel cells produced in Examples 1 to 4 and Comparative Examples 1 to 5 was measured in the following manner.

Prior to measurement, catalyst layer samples, each measuring 3 cm×3 cm, were produced under the same conditions as used in the formation of the upstream portion, the midstream portion, and the downstream portion of the cathode catalyst layer in each Example and Comparative Example. In other words, samples each singly composed of the upstream portion, the midstream portion (alternatively, the first midstream portion or the second midstream portion) or the downstream portion of the cathode catalyst layer were produced.

Next, MEA samples were produced in the same manner as in Example 1 using the catalyst layer samples produced in the above. Fuel cell samples were produced in the same manner as in Example 1 except that these MEA samples were used.

With the use of the fuel cell samples thus produced, the effective reaction area per unit area of each portion of the cathode catalyst layer was determined as follows by cyclic voltammetry (CV). To be concrete, while humidified nitrogen gas was allowed to flow in the cathode at a rate of 0.04 mL/min and humidified hydrogen gas was allowed to flow in the anode at a rate of 0.01 mL/min, the potential difference between the cathode and the anode was changed in the range of 0.07 V to 0.6 V at a rate of 10 mV·s$^{-1}$, to obtain a current-potential curve. From the current-potential curve thus obtained, an amount of electricity generated through hydrogen adsorption/desorption was obtained. The value thus obtained was divided by 210 μC/cm$^2$, which was an amount of electricity generated through hydrogen adsorption/desorption per 1 cm$^2$ of platinum (Pt). The resultant value was further divided by the area of electrode (9 cm$^2$), thereby to give an effective reaction area per unit area in each specific portion. The results are shown in Table 1. The Pt catalyst contents per unit projection area in the upstream portion, the midstream portion (the first midstream portion and the second midstream portion), and the downstream portion of the cathode catalyst layer of each fuel cell are also show in Table 1.

Next, the durability of the fuel cells A to D and the comparative fuel cells 1 to 5 were evaluated. The evaluation was performed in the following manner.

(Durability)

While an aqueous 4M methanol solution serving as the fuel was supplied to the anode at a rate of 0.27 cc/min, and air serving as the oxidant was supplied to the cathode at a rate of 0.26 L/min, each fuel cell was subjected to continuous power generation at a constant voltage of 0.4 V. The temperature of the battery during the power generation was set to 60° C.

The value of power density was calculated from a value of current density measured four hours after the start of power generation. The obtained value was defined as an initial power density. Thereafter, from a value of current density measured 2000 hours after the start of power generation, the value of power density was calculated.

The ratio of a power density after 2000-hour operation to an initial power density was calculated, which was defined as a power density retention rate. The results are shown in Table 1. In Table 1, the current density retention rate is expressed as a percentage.

crossover methanol oxidation reaction to proceed simultaneously was ensured. Moreover, in the cathode-side power generation region facing the downstream of the fuel flow channel where the amount of MCO was reduced, the number of catalyst reaction sites was optimized such that the supply of oxidant and the discharge of water from the deep portion of the catalyst layer were not inhibited. Presumably for this reason, the cathodic overvoltage was reduced and the durability of the fuel cell was improved.

Among the fuel cells A to D, the fuel cells C and D had remarkably improved durability. In the fuel cells C and D, the distribution of the catalyst content in the cathode catalyst layer was optimized according to the amount of MCO, and in particular, in the midstream portion of the cathode catalyst layer, the supply of oxidant and the discharge of water from the deep portion of the catalyst layer were improved. Presumably for this reason, the cathodic overvoltage was maintained at a low level.

TABLE 1

| | | Cathode catalyst layer | | | | Durability | |
|---|---|---|---|---|---|---|---|
| | | Upstream portion | First midstream portion | Second midstream portion | Lower stream portion | Initial power density (mW/cm$^2$) | Power density retention rate (%) |
| Fuel cell A | Effective reaction area (cm$^2$/cm$^2$) | 742 | 414 | 414 | 414 | 74 | 91 |
| | Catalyst content (mg/cm$^2$) | 1.66 | 0.91 | 0.91 | 0.91 | | |
| Fuel cell B | Effective reaction area (cm$^2$/cm$^2$) | 742 | 742 | 742 | 414 | 71 | 87 |
| | Catalyst content (mg/cm$^2$) | 1.66 | 1.66 | 1.66 | 0.91 | | |
| Fuel cell C | Effective reaction area (cm$^2$/cm$^2$) | 742 | 577 | 577 | 414 | 77 | 97 |
| | Catalyst content (mg/cm$^2$) | 1.66 | 1.29 | 1.29 | 0.91 | | |
| Fuel cell D | Effective reaction area (cm$^2$/cm$^2$) | 742 | 662 | 577 | 414 | 83 | 98 |
| | Catalyst content (mg/cm$^2$) | 1.66 | 1.48 | 1.29 | 0.91 | | |
| Comparative fuel cell 1 | Effective reaction area (cm$^2$/cm$^2$) | 742 | 742 | 742 | 742 | 71 | 77 |
| | Catalyst content (mg/cm$^2$) | 1.66 | 1.66 | 1.66 | 1.66 | | |
| Comparative fuel cell 2 | Effective reaction area (cm$^2$/cm$^2$) | 414 | 414 | 414 | 742 | 54 | 46 |
| | Catalyst content (mg/cm$^2$) | 0.91 | 0.91 | 0.91 | 1.66 | | |
| Comparative fuel cell 3 | Effective reaction area (cm$^2$/cm$^2$) | 414 | 742 | 742 | 742 | 63 | 33 |
| | Catalyst content (mg/cm$^2$) | 0.91 | 1.66 | 1.66 | 1.66 | | |
| Comparative fuel cell 4 | Effective reaction area (cm$^2$/cm$^2$) | 414 | 577 | 577 | 742 | 57 | 72 |
| | Catalyst content (mg/cm$^2$) | 0.91 | 1.29 | 1.29 | 1.66 | | |
| Comparative fuel cell 5 | Effective reaction area (cm$^2$/cm$^2$) | 414 | 577 | 662 | 742 | 61 | 65 |
| | Catalyst content (mg/cm$^2$) | 0.91 | 1.29 | 1.48 | 1.66 | | |

As shown in Table 1, the power density retention rates of the fuel cells A to D were extremely high. In the invention, instead of homogeneously increasing the catalyst reaction sites where at least two phases, the catalyst phase and the electrolyte phase, coexist throughout the entire cathode catalyst layer, the upstream-side effective reaction area was made larger than the downstream-side effective reaction area. In other words, in the cathode-side power generation region facing the upstream of the fuel flow channel where an amount of MCO was large, the number of catalyst reaction sites required for allowing the oxidant reduction reaction and the In contrast, the power density retention rates of the comparative fuel cells 1 to 5 were extremely low as compared with those of the fuel cells A to D. In the comparative fuel cells, since the catalyst was contained in excess in the downstream portion of the cathode catalyst layer facing the downstream of the fuel flow channel, the porosity in the cathode catalyst layer was low. Because of this, condensed water was accumulated in the downstream portion of the cathode catalyst layer with the passage of power generation time, making it difficult for oxidant to be surely supplied into the deep portion of the catalyst layer. Presumably for this reason, the durability was reduced.

Further, in the comparative fuel cells 2 to 5, the initial power densities were low. In the comparative fuel cells 2 to 5, the effective reaction area per unit area was small in the upstream portion of the cathode catalyst layer facing the upstream of the fuel flow channel. As such, in the upstream portion of the cathode catalyst layer, the number of catalyst reaction sites falls short of that required for allowing the oxidant reduction reaction and the crossover methanol oxidation reaction to proceed simultaneously. Presumably for this reason, in these comparative fuel cells, the cathodic overvoltage was significantly increased, and therefore no current was produced.

The direct oxidation fuel cell of the invention is excellent in power generating performance and durability, thus being useful, for example, as the power source for portable small-sized electronic equipment such as cellular phones, notebook personal computers, and digital still cameras, and the like. Further, the direct oxidation fuel cell of the invention is also useful as the power source for electric scooters, automobiles, and the like.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. A direct methanol oxidation fuel cell comprising at least one unit cell, said unit cell comprising a membrane-electrode assembly including an electrolyte membrane and an anode and a cathode sandwiching said electrolyte membrane, an anode-side separator being in contact with said anode, and a cathode-side separator being in contact with said cathode, wherein
   said anode includes an anode catalyst layer and an anode diffusion layer, said anode catalyst layer containing an anode catalyst;
   said cathode includes a cathode catalyst layer and a cathode diffusion layer, said cathode catalyst layer containing a cathode catalyst;
   said anode-side separator has a fuel flow channel for supplying methanol to said anode;
   said cathode-side separator has an oxidant flow channel for supplying oxidant to said cathode; and
   a portion of said cathode catalyst layer facing the upstream of said fuel flow channel has an effective reaction area per unit area larger than that of a portion of said cathode catalyst layer facing the downstream of said fuel flow channel over the whole cathode catalyst layer.

2. The direct methanol oxidation fuel cell in accordance with claim 1, wherein the effective reaction area per unit area is gradually reduced from the upstream toward the downstream of said fuel flow channel.

3. The direct methanol oxidation fuel cell in accordance with claim 1, wherein the portion of said cathode catalyst layer facing the upstream of said fuel flow channel has a cathode catalyst content per unit area larger than that of the portion of said cathode catalyst layer facing the downstream of said fuel flow channel.

4. The direct methanol oxidation fuel cell in accordance with claim 3, wherein the cathode catalyst content per unit area is gradually reduced from the upstream toward the downstream of said fuel flow channel.

* * * * *